United States Patent
Noda et al.

(10) Patent No.: US 7,406,221 B2
(45) Date of Patent: Jul. 29, 2008

(54) TWO-DIMENSIONAL PHOTONIC CRYSTAL MULTIPLEXER/DEMULTIPLEXER

(75) Inventors: Susumu Noda, Uji (JP); Takashi Asano, Kyoto (JP); Yoshihiro Akahane, Itami (JP)

(73) Assignees: Japan Science & Technology Agency, Kawaguchi (JP); Sumitomo Electric Industries, Ltd., Osaka (JP)

( * ) Notice: Subject to any disclaimer, the term of this patent is extended or adjusted under 35 U.S.C. 154(b) by 132 days.

(21) Appl. No.: 10/566,843

(22) PCT Filed: Aug. 24, 2004

(86) PCT No.: PCT/JP2004/012114
§ 371 (c)(1),
(2), (4) Date: Feb. 2, 2006

(87) PCT Pub. No.: WO2005/022219
PCT Pub. Date: Oct. 3, 2005

(65) Prior Publication Data
US 2006/0204161 A1      Sep. 14, 2006

(30) Foreign Application Priority Data
Aug. 29, 2003   (JP)   ............................. 2003-307654

(51) Int. Cl.
G02B 6/24      (2006.01)
H04J 14/00     (2006.01)
(52) U.S. Cl. .............................. 385/30; 385/14; 398/82
(58) Field of Classification Search ................... 385/30; 398/82
See application file for complete search history.

(56) References Cited
U.S. PATENT DOCUMENTS
2002/0191905 A1   12/2002   Prather et al.
(Continued)

FOREIGN PATENT DOCUMENTS
FR              2 841 658           1/2004
(Continued)

OTHER PUBLICATIONS
Yoshimasu Sugimoto et al; 29a-YN-5; "Design and characteriziation of coupling-controlled directional coupler (CC-DC) Based on photonic-crystal FESTA"; Mar. 2003; p. 1137.
(Continued)

Primary Examiner—Michelle Connelly-Cushwa
Assistant Examiner—Jerry T. Rahll
(74) Attorney, Agent, or Firm—Oliff & Berridge, PLC.

(57) ABSTRACT

An object of the present invention is to provide a multiplexer/demultiplexer capable of preventing a decrease in multiplexing/demultiplexing efficiency due to an error in wavelength or due to a crosstalk with other wavelengths. A two-dimensional photonic crystal having holes 22 cyclically arranged is provided with an input waveguide 23 and an output waveguide 24. Located between the two waveguides are two point-like defects 25 and 26, each consisting of a region devoid of the holes 22. From the light including various wavelengths and propagating through the input waveguide 23, the two point-like defects extract a ray of light having a wavelength determined by the shape of the point-like defects and introduce it into the output waveguide 24. Compared with the case where there is only one point-like defect, the above-described construction increases the values of the wavelength spectrum of the extracted light at around the resonance wavelength and decreases the values at the wavelength range far from the resonance wavelength. Therefore, the increase in the values of the wavelength spectrum at around the resonance wavelength ensures that the light having the desired wavelength can be extracted from the waveguide by a large amount even if the wavelength of the light propagating through the waveguide is erroneously shifted from the resonance frequency. Occurrence of noises within a wavelength range far from the resonance wavelength and extraction of light having the wavelengths of adjacent channels are also suppressed.

9 Claims, 7 Drawing Sheets

U.S. PATENT DOCUMENTS

| | | |
|---|---|---|
| 2003/0011775 A1 | 1/2003 | Soljacic et al. |
| 2005/0152649 A1 | 7/2005 | Benisty et al. |

FOREIGN PATENT DOCUMENTS

| | | |
|---|---|---|
| JP | A 62-100706 | 5/1987 |
| JP | A 2001-228347 | 8/2001 |
| JP | A 2001-272555 | 10/2001 |
| WO | WO 98/57207 | 12/1998 |
| WO | WO 01/20379 A1 | 3/2001 |
| WO | WO 2004/068205 A1 | 8/2004 |

OTHER PUBLICATIONS

Yoshihiro Akahane et al; "Design of a channel drop filter by using a donor-type cavity with high-quality factor in a two-dimensional photonic crystal slab"; Applied Physics Letters; vol. 82, No. 9; Mar. 3, 2003; pp. 1341-1343.

Bong-Shik Song et al; "Photonic Devices Based on In-Plane Hetero Photonic Crystals"; Science; vol. 300; Jun. 6, 2003; p. 1537, right column, lines 1-9, Fig. 1D.

B.S. Song et al; 29a-YN-4; "Improvement of Optical Add/Drop Filtering efficiency by using an In-Plane Hetero structure Interface"; Mar. 2003; p. 1137.

Akahane et al; 29a-YN-9; "Drastic Increase of Quality Factor of Defect-Cavities in 2D Photonic Crystal Slabs by Modifying Defect Structure"; Mar. 2003; p. 1138.

Akahane et al; 1p-ZM-3; "Optical Add/Drop Devices Using 2D Photonic Crystal—Design of device structures to achieve flat-top transfer function in filtering responses"; 2003; p. 944.

Y. Sugimoto et al; "Design, fabrication, and characterization of coupling-strength-controlled directional coupler based on two-Dimensional photonic-crystal slab waveguides"; Applied Physics Letters; Oct. 20, 2003; vol. 83, No. 16; pp. 3236-3238.

Y. Akahane et al; "High-Q photonic nanocavity in a two-dimensional photonic crystal"; Nature Publishing Group; Oct. 30, 2003; vol. 425; pp. 944-947.

B.E. Little et al; "Microring Resonator Channel Dropping Filters"; Journal of Lightwave Technology; vol. 15, No. 6, Jun. 1997; pp. 998-1005.

S. Fan et al; "Channel Drop Tunneling through Localized States"; Physical Review Letters; The American Physical Society; Feb. 2, 1998; vol. 80, No. 5; pp. 960-963.

M.J. Khan et al; "Mode-Coupling Analysis of Multipole Symmetric Resonant Add/Drop Filters"; IEEE Journal of Quantum Electronics; Oct. 1999; vol. 35; No. 10; pp. 1451-1460.

Jin, Chongjun et al; "Reflectionless Multichannel Wavelength Demultiplexer in a Transmission Resonator Configuration", *IEEE Journal of Quantum Electronics*, vol. 39, No. 1, Jan. 2003, pp. 160-161.

TWO-DIMENSIONAL PHOTONIC CRYSTAL MULTIPLEXER/DEMULTIPLEXER

TECHNICAL FIELD

The present invention relates to a two-dimensional photonic crystal multiplexer/demultiplexer used for wavelength division multiplexing communication or other techniques. Particularly, it relates to a technique for improving the multiplexing/demultiplexing characteristics.

BACKGROUND ART

In recent years, the techniques used in wavelength division multiplexing (WDM) transmission systems have made remarkable progress. WDM is a technique for transmitting multiple pieces of information by propagating plural wavelengths (or frequencies) of light through a single transmission line, with each wavelength of light carrying a different signal (Note: the term "light" used in this specification includes electromagnetic waves). This technique requires an optical multiplexer and an optical demultiplexer, or wavelength filters, for mixing multiple wavelengths of light at the inlet of the transmission line and then separating the mixed light into each wavelength of light at the outlet. An example of conventional demultiplexers is arrayed waveguide grating. However, to adequately decrease the loss of light, arrayed waveguide gratings currently used are somewhat oversized, as large as roughly several square centimeters.

To increase the capacity of the transmission system and reduce the size of the devices used in it, developments of multiplexers, demultiplexers and wavelength filters using photonic crystals are underway. A photonic crystal is a functional material having a cyclic distribution of refractive index, which provides a band structure with respect to the energy of light. This device is particularly featured in that it has an energy region (called the photonic bandgap) that does not allow the propagation of light. Introduction of an appropriate defect into the distribution of refractive index in the photonic crystal creates an energy level (called the defect level) due to the defect within the photonic bandgap. This allows only a specific wavelength of light having an energy corresponding to the defect level to exist within the wavelength range corresponding to the energy levels included in the photonic bandgap. Forming a linear defect in the crystal provides a waveguide, and forming a point-like defect in the crystal provides a resonator. The shape of the defect determines a wavelength, called the resonance wavelength, at which the resonance of light takes place.

Non-Patent Document 1 discloses the result of a computer simulation of a photonic crystal composed of infinitely long cylindrical elements made of a high refractive index material and arranged in a square lattice pattern. This construction allows light to be controlled by the photonic bandgap within a plane parallel to the square lattice. However, it does not enable the control of light in the direction perpendicular to the aforementioned plane. Photonic crystals having such a construction are impractical.

Patent Document 1 discloses a photonic crystal having a plate-shaped body in which plural areas having a refractive index different from that of the body (called the "modified refractive index area" hereinafter) are cyclically arranged to create a cyclic distribution of refractive index. This construction can control light within the body because a photonic bandgap is present within the plane of the body and the difference in refractive index between the body and the surrounding air confines light within the body in the direction perpendicular to the body. In this construction, a waveguide is formed by eliminating the modified refractive index areas along a line ([0025], FIG. 1), and a point-like defect is formed by eliminating the modified refractive index areas within a point-like region ([0029], FIG. 1). As an embodiment, Patent Document 1 shows a two-dimensional photonic crystal having modified refractive index areas, each consisting of a cylindrical hole, cyclically arranged in a triangular lattice pattern, where the diameter of one of the cylindrical holes located in the proximity of the waveguide is increased to be a point-like defect.

[Non-Patent Document 1] S. Fan et al., "Channel Drop Tunneling through Localized States", Physical Review Letters, (US), American Physical Society, 1998, vol. 80, pp. 960-963

[Patent Document 1] Japanese Unexamined Patent Publication No. 2001-272555 ([0025], [0029], FIG. 1)

This type of two-dimensional photonic crystal can function as a demultiplexer for separating a ray of light whose wavelength equals to the resonance wavelength of the point-like defect from the light including plural wavelengths superimposed and propagating through the waveguide, and for emitting the light through the point-like defect to the outside. It can also function as a multiplexer that introduces, from the outside of the crystal, a ray of light whose wavelength equals to the resonance wavelength of the point-like defect into superimposed light propagating through the waveguide. Thus, one and the same two-dimensional photonic crystal can function as a multiplexer and as a demultiplexer. Such a two-dimensional photonic crystal is called the "multiplexer/demultiplexer" in this specification. Creating plural point-like defects having different shapes in the proximity of the waveguide provides a multiplexer/demultiplexer in which each point-like defect multiplexes or demultiplexes a ray of light having a different wavelength. In the case where the plural wavelengths of light each carries a different signal, it is possible to extract a specific signal from the transmission line (i.e. the waveguide) with the demultiplexer or introduce a specific signal into the transmission line with the multiplexer.

Figure 1:
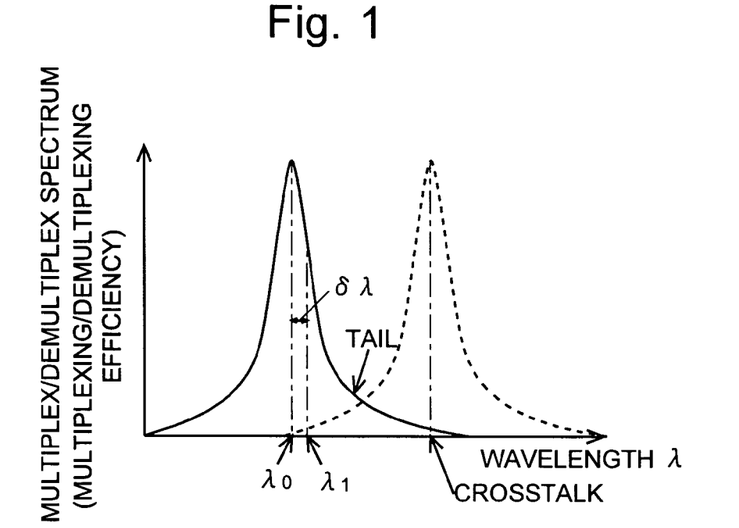
FIG. 1 is an illustration for explaining problems relating to the multiplex/demultiplex spectrum of a conventional two-dimensional photonic crystal multiplexer/demultiplexer.

In the above-described multiplexer/demultiplexer, the point-like defect multiplexes or demultiplexes not only the ray of light having its resonance wavelength, $\lambda_0$, but also other rays of light included within a certain wavelength range around the resonance wavelength $\lambda_0$ by certain percentages. In the case of the above-described conventional two-dimensional photonic crystal multiplexer/demultiplexer, the multiplex/demultiplex spectrum takes the form of a Lorenz function around the resonance wavelength $\lambda_0$, as shown in FIG. 1. A multiplex/demultiplex spectrum expressed by a Lorenz function has a sharp peak; the value of the multiplex/demultiplex spectrum rapidly falls as the distance from the resonance wavelength $\lambda_0$ increases, and it forms a long tail as the distance becomes much larger. Such a multiplex/demultiplex spectrum expressed by a Lorenz function is accompanied by two problems to be solved with respect to the multiplexing/demultiplexing operations.

Figure 12:
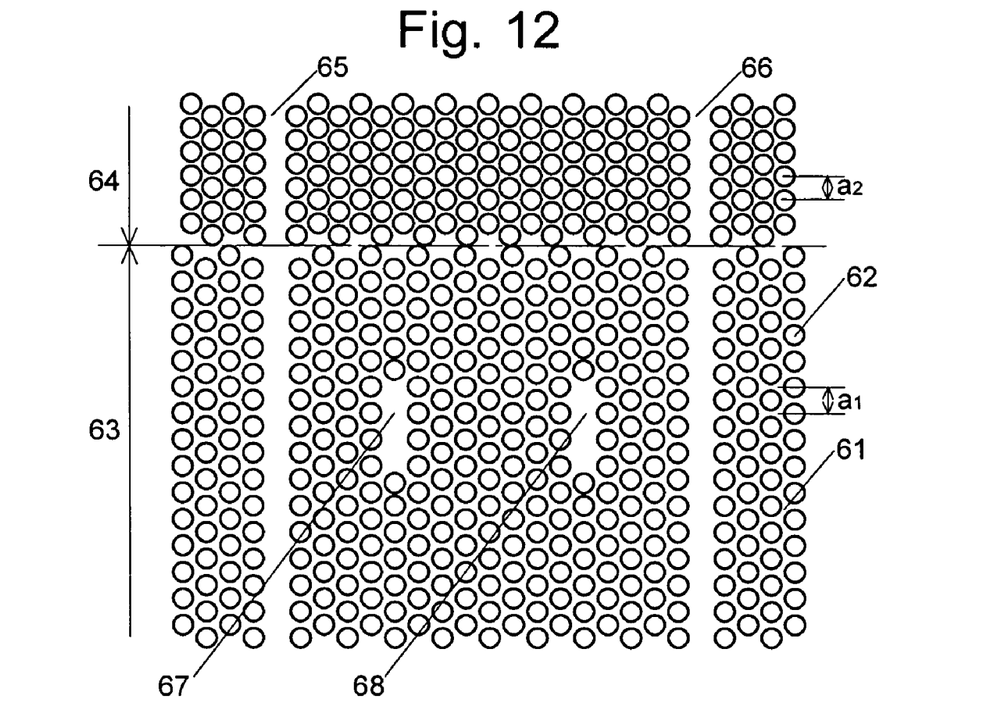
FIG. 12 is a plan view of an embodiment of the two-dimensional photonic crystal multiplexer/demultiplexer having a heterostructure.
Figure 13:
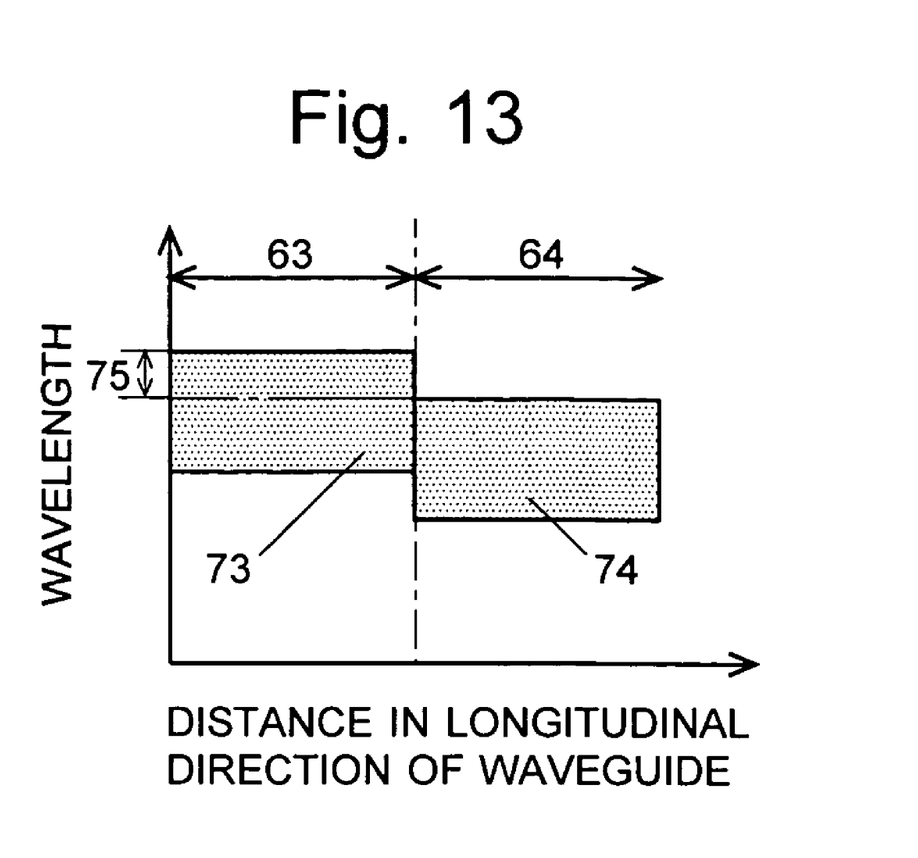
FIG. 13 is a chart showing the transmission wavelength band of the waveguide of the two-dimensional photonic crystal multiplexer/demultiplexer having a heterostructure.

The first problem results from the sharpness of the peak of the multiplex/demultiplex spectrum. An aged deterioration or a temperature change in the waveguide 66 have the same transmission wavelength band because they are identically shaped. The difference in cycle between the forbidden band zones 63 and 64 produces a wavelength band 75 that is included within the transmission wavelength band 73 of the waveguide in the forbidden band zone 63 but not within the transmission wavelength band 74 of the waveguide in the forbidden band zone 64. The two cycles can be appropriately determined so that the resonance wavelength of the point-like defects 67 and 68 falls within the wavelength band 75. In this construction, the light having the resonance wavelength and propagating through the input waveguide 65 is reflected at the boundary between the forbidden band zones 63 and 64. A ray of light haveing the resonance wavelength that has passed by the point-like defects 67 and 68 without being introduced into them is reflected back and introduced into the point-like defects 67 and 68. Thus, the demultiplexing efficiency is enhanced. Similarly, if a demultiplexed ray of light is introduced through the point-like defects 67 and 68 into the output waveguide 66, the light is reflected at the boundary between the forbidden band zones 63 and 64 and extracted from only one end of the output waveguide 66. This also contributes to the enhancement of the demultiplexing efficiency. system used may cause an error in the wavelength of light propagating through the waveguide or in the resonance wavelength of the multiplexer/demultiplexer. This will cause a discrepancy $\delta\lambda$ between the resonance wavelength $\lambda_0$ of the point-like defect (i.e. the peak wavelength of the multiplex/demultiplex spectrum) and the wavelength $\lambda_1$ of the light propagating through the waveguide. As can be understood from FIG. 1, even a very small discrepancy will make the value of the multiplex/demultiplex spectrum at $\lambda_1$ considerably smaller than at $\lambda_0$. This means that even a slight change in the wavelength can deteriorate the multiplexing/demultiplexing efficiency if the multiplex/demultiplex spectrum is expressed by a Lorenz function.

The second problem results from the long tail of the multiplex/demultiplex spectrum. Presence of such a long tail will allow rays of light having wavelengths far from $\lambda_0$ to be undesirably mixed, thus causing a noise. Also, the tail may overlap the wavelength of the signal of an adjacent channel, causing a crosstalk between the two signals.

DISCLOSURE OF THE INVENTION

Problems to be Solved by the Invention

Thus, the present invention intends to provide a two-dimensional photonic crystal multiplexer/demultiplexer capable of preventing the multiplexing/demultiplexing efficiency from deteriorating due to an error of the input signal or the resonance wavelength, and also suppressing the crosstalk caused by the tail of the multiplex/demultiplex spectrum, each problem being attributable to the peak shape of the multiplex/demultiplex spectrum of each point-like defect.

Means for Solving the Problems

To solve the above-described problems, the present invention provides a two-dimensional photonic crystal multiplexer/demultiplexer, which is characterized by:

a) a slab-shaped body;

b) a plurality of areas arranged in a lattice pattern with a predetermined cycle within the body, where the refractive index of the aforementioned areas differs from that of the body;

c) a first optical input/output section consisting of a waveguide formed in the body, where the waveguide is made of a linear defect of the modified refractive index areas;

d) a second optical input/output section formed in the body; and e) two or more point-like defect resonators composed of point-like defects having substantially the same resonance wavelength and arranged in series between the first and second optical input/output sections, each point-like defect consisting of a point-like region devoid of the modified refractive index areas.

The two-dimensional photonic crystal multiplexer/demultiplexer according to the present invention has a body consisting of a slab, or a thin plate whose size in the in-plane direction is much larger than its thickness. This body is provided with areas (i.e. the modified refractive index areas) having a refractive index different from that of the body and being arranged in a lattice pattern with a predetermined cycle. This construction provides a two-dimensional photonic crystal having a photonic bandgap that prevents rays of light within a specific wavelength band determined by the aforementioned cycle from passing through the body along the in-plane direction. Within the two-dimensional photonic crystal having the above-described structure, light is totally reflected at the boundary between the body and the outside (e.g. the air) due to the difference in refractive index between them. Thus, the light is prevented from escaping from the body to the outside. Examples of the lattice pattern for arranging the modified refractive index areas are triangular lattice patterns and square lattice patterns. The refractive index of the modified refractive index areas may be higher or lower than that of the body. The modified refractive index areas may be holes arranged in a cyclic pattern in the body. This construction is preferable because it produces a large difference in refractive index between the areas and the body. Another point is that it is easy to manufacture.

The body is provided with a first optical input/output section consisting of a waveguide made of a linear defect of the modified refractive index areas. In a typical example, the waveguide is formed by eliminating the modified refractive index areas, or by omitting the modified refractive index areas, along a line. The waveguide functions as an optical input section for introducing light including plural wavelengths superimposed into the demultiplexer if it is used as a demultiplexer, or as an optical output section for extracting light including plural wavelengths superimposed to the outside if it is used as a multiplexer.

The body is also provided with a second optical input/output section. This section functions as an optical output section for extracting light having a specific wavelength to the outside of the crystal if it is used as a demultiplexer, or as an optical input section for introducing light having a specific wavelength into the multiplexer if it is used as a multiplexer. The second optical may be either a waveguide or a point-like defect. A second optical input/output section taking the form of a point-like defect can be formed by creating a point-like region devoid of the modified refractive index areas. The point-like defect can be obtained by making the size of one of the modified refractive index areas different from that of the others or by eliminating one of these areas. It is also possible to make the point-like defect composed of two or more modified refractive index areas adjacent to each other. In this case, the set of modified refractive index areas is regarded as a single point-like defect. To extract light from the crystal to the outside or introduce light into the multiplexer as described earlier, it is desirable to make the Q-value between the point-like defect and the outside of the crystal smaller than that of the point-like defect resonators to be described later. Q-value is an index that represents the performance of a resonator, which, by definition, is inversely proportional to the percentage of the amount of energy leaking from the resonators per unit of time. Accordingly, a larger Q-value will reduce the amount of energy of light leaking from the resonator. A second optical input/output section taking the form of a waveguide can be formed by the same method as used for forming the waveguide of the first optical input/output section. It is also possible to add one or more point-like defects in the proximity of the waveguide of the second optical input/ output section so that light can be extracted from the waveguide via the point-like defect to the outside of the crystal, or introduced into the multiplexer through the point-like defect.

Between the first and second input/output sections, two or more point-like defect resonators having substantially the same resonance wavelength are arranged in series. For example, they can be arranged along the direction perpendicular to the waveguide of the first optical input/output section, along a direction at an angle to the waveguide, or in a zigzag pattern. The point-like defect resonators can be formed by the same method as used for forming the point-like defect of the aforementioned optical input/output section.

The point-like defect resonators, which do not directly introduce or emit light from or to the outside, should be preferably designed so that it allows only a small amount of light to leak to the outside of the crystal. A donor type defect formed by creating a region devoid of the modified refractive index areas, or by omitting the modified refractive index areas, is more suitable for the point-like defect resonators than an acceptor type defect obtained by increasing the size of one of the modified refractive index areas because the donor type yields a higher Q-value ($Q_v$) between each point-like defect resonator and the outside of the crystal than that obtained with the acceptor type. The value $Q_v$ can be further increased by shifting the modified refractive index area within the proximity of the point-like defect resonators from the position determined by the arrangement cycle. Suppose that the point-like defect formed by eliminating three modified refractive index areas located adjacent to each other on a straight line. Then, $Q_v \sim 5200$ if there is no shift of the modified refractive index areas, whereas $Q_v \sim 45000$ if two modified refractive index areas located closest to the point-like defect are shifted.

Light is transmitted between the first optical input/output section and the point-like defect resonator closest to the first optical input/output section, between each pair of adjacent point-like defect resonators, and between the second optical input/output section and the point-like defect resonator closest to the second optical input/output section. The Q-value determined by the components concerned and their distance will be an index of the transmission of light.

The two-dimensional photonic crystal optical multiplexer/demultiplexer constructed as described above functions as either a multiplexer or a demultiplexer as follows. Firstly, the operation of a demultiplexer for separating a ray of light having a predetermined wavelength from light including plural wavelengths superimposed is described. When the superimposed light is propagated through the waveguide of the first optical input/output section, the point-like defect resonator closest to the waveguide traps only a ray of light whose wavelength equals to the resonance wavelength of the point-like defect resonators from the superimposed light. The trapped light is then successively captured by the adjacent point-like defects and finally reaches the second optical input/output section, which emits the light to the outside of the crystal. In the case of a multiplexer, a ray of light whose wavelength equals to the resonance wavelength of the point-like defect resonators is introduced into the second optical input/output section and then successively trapped by the point-like defect resonators in the opposite order. The trapped light finally reaches the waveguide of the first optical input/output section, where it is mixed into the superimposed light propagating through the waveguide.

Figure 2A:
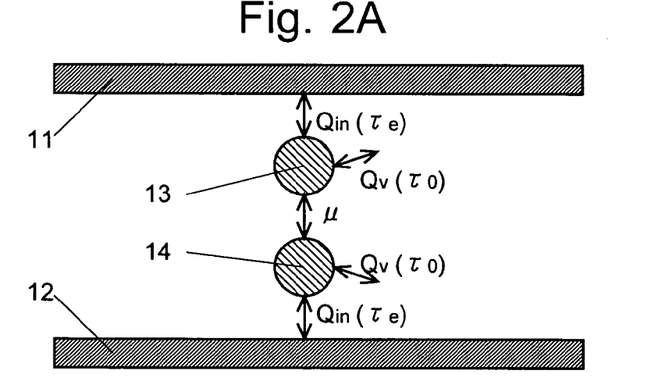
FIG. 2A is a schematic diagram of a two-dimensional photonic crystal multiplexer/demultiplexer according to the present invention.

The spectrum of the light multiplexed or demultiplexed by the multiplexer/demultiplexer according to the present invention is examined. This examination assumes that there are two point-like defect resonators located between the two optical input/output sections, as shown in FIG. 2A. For comparison, the multiplex/demultiplex spectrum obtained with a conventional multiplexer/demultiplexer having only one point-like defect resonator between the two optical input/output sections, as shown in FIG. 2B, is also examined.

In FIG. 2A, two point-like defect resonators 13 and 14, both having a resonance wavelength $\lambda_0$ and a resonance frequency $\omega_0$ ($=2\pi c/\lambda_0$, where c is the speed of light), are located between a first optical input/output section 11 consisting of a waveguide and a second optical input/output section 12 consisting of another waveguide formed in the same manner as the first one. Let $Q_{in}$ denote both the Q-value between the first optical input/output section and the point-like defect resonator closest to that section and the Q-value between the second optical input/output section and the point-like defect resonator closest to that section. Also, let $Q_v$ denote the Q-value between each of the point-like defect resonators and the outside of the crystal. The present analysis uses attenuation constants $\tau_e$ and $\tau_0$ defined as $\tau_e = 2Q_{in}/\omega_0$ and $\tau_0 = 2Q_v/\omega_0$. The mutual coupling coefficient between the two point-like defect resonators is denoted by $\mu$. Letting $a_L$ and $a_R$ denote the amplitudes of the two resonators observed under the condition that no waveguide is present, $\mu$ can be derived from the following equations: $da_L/dt = (j\omega_0 - 1/\tau_0)a_L - j\mu a_R$ and $da_R/dt = (j\omega_0 - 1/\tau_0)a_R - j\mu a_L$. Using these parameters, a calculation based on the mode coupling theory gives the multiplex/demultiplex spectrum $I(\omega)$ as follows:

$$I(\omega) = \frac{1}{\frac{\tau_e^2}{\mu^2}\left[\left\{\left(\frac{1}{\tau_0}+\frac{1}{\tau_e}\right)^2+\mu^2\right\}^2 + 2\left\{\left(\frac{1}{\tau_0}+\frac{1}{\tau_e}\right)^2-\mu^2\right\}(\omega-\omega_0)^2+(\omega-\omega_0)^4\right]} \quad (1)$$

Figure 2B:
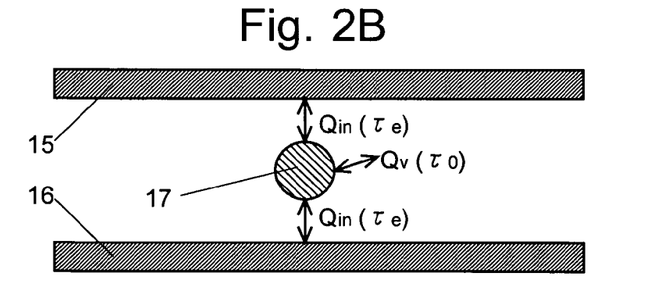
FIG. 2B is another two-dimensional photonic crystal multiplexer/demultiplexer as a comparative example having only one point-like defect resonator.

The conventional multiplexer/demultiplexer shown in FIG. 2B has only one point-like defect resonator 17 between the first optical input/output section 15 consisting of a waveguide and the second optical input/output section 16 consisting of another waveguide having the same structure. In this case, the multiplex/demultiplex spectrum is calculated as follows:

$$I(\omega) = \frac{1}{\left(\frac{\tau_e}{\tau_0}+2\right)^2+\tau_e^2(\omega-\omega_0)^2} \quad (2)$$

Equation (2) is an expression of the Lorenz type multiplex/demultiplex spectrum described earlier; it has a term of frequency $\omega^2$ in the denominator. In contrast, the denominator in equation (1) includes an $\omega^4$ term in addition to an $\omega^2$ term. Compared to the $\omega^2$ term, the $\omega^4$ term helps the value of the multiplex/demultiplex spectrum to increase within a range close to the resonance frequency $\omega_0$ and decrease within a range far from $\omega_0$. As a result, in the multiplexer/demultiplexer according to the present invention, the multiplex/demultiplex spectrum takes (i) larger values within a range close to $\omega_0$ and (ii) smaller values within a range far from $\omega_0$, compared to that of the conventional multiplexer/demultiplexer.

If $\mu^2 = (1/\tau_0 + 1/\tau_e)^2$, the $\omega^2$ term in the denominator in equation (1) equals to zero, meaning that the $\omega^4$ term works most effectively.

Figure 3A:
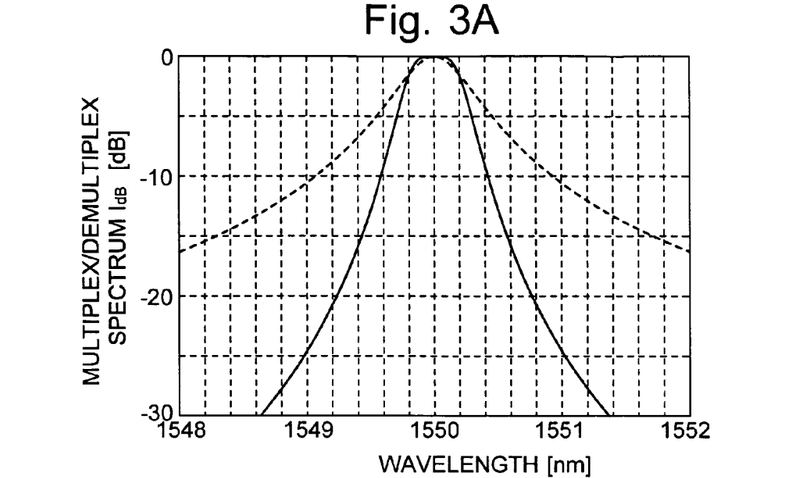
FIGS. 3A and 3B are graphs showing an example of the multiplex/demultiplex spectrum of a two-dimensional photonic crystal multiplexer/demultiplexer according to the present invention.
Figure 3B:
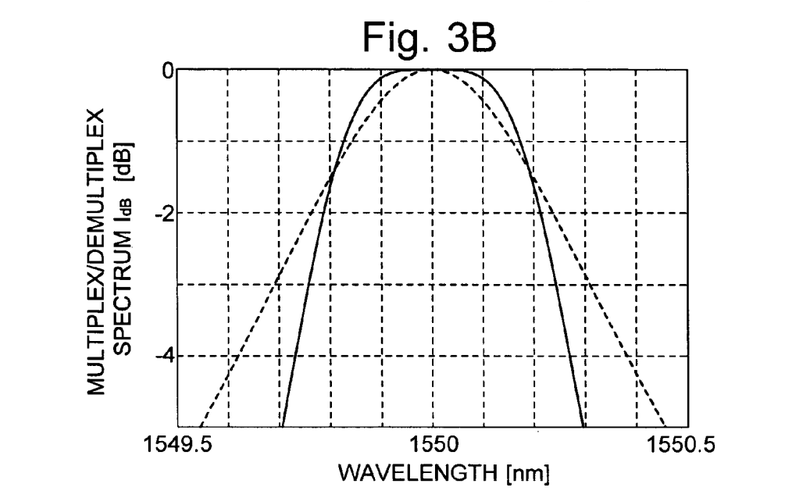

FIGS. 3A and 3B each show examples of multiplex/demultiplex spectrums: one expressed by equation (1) with $\mu^2=(1/\tau_0+1/\tau_e)^2$ and the other expressed by equation (2). The solid lines correspond to equation (1) and the broken lines correspond to equation (2). The abscissa indicates the wavelength, and the ordinate indicates the multiplex/demultiplex spectrum I($\lambda$) in decibels: $I_{dB}=10\times\log[I(\lambda)/I(\lambda_0)]$. The resonance wavelength $\lambda_0$ is 1550 nm. FIG. 3B is an enlarged view of FIG. 3A. From the shapes of these multiplex/demultiplex spectrums, it is clear that the two-dimensional photonic crystal optical multiplexer/demultiplexer according to the present invention yields the following effects: (i) The multiplex/demultiplex spectrum takes larger values within a range close to $\omega_0$. Even if the frequency $\omega_1$ of the light propagating through the waveguide is shifted from the resonance frequency $\omega_0$ for some reason, such as an error in the wavelength of the light propagating through the waveguide or an error of the resonator, the multiplex/demultiplex spectrum maintains a large value at frequency $\omega_1$. Therefore, the multiplexing/demultiplexing efficiency becomes higher than that of the conventional multiplexer/demultiplexer. In case (i), the multiplex/demultiplex spectrum becomes flattened at around the resonance frequency $\omega_0$, as shown in FIGS. 3A and 3B. In the following description, the flattened shape of the multiplex/demultiplex spectrum is referred to as the "flattop."

(ii) The multiplex/demultiplex spectrum takes smaller values within a range far from $\omega_0$. This prevents undesired wavelengths of light from being mixed into the multiplexed or demultiplexed light and thereby causing a noise. It also suppresses the crosstalk caused by the overlapping of the signal frequency of an adjacent channel.

For the multiplexer/demultiplexer, it is desirable that the value of the multiplex/demultiplex spectrum at a frequency shifted from the resonance frequency $\omega_0$ by 0.005% is equal to or larger than −1 dB (or 79%) of the value at $\omega_0$. To satisfy this condition, the ratio of $\mu^2$ to $[(\omega_0/2)\times(1/Q_{in}+1/Q_v)]^2$, i.e. $\mu^2/[(\omega_0/2)\times(1/Q_{in}+1/Q_v)]^2$, should be preferably 0.2~10. This ratio is called the "coupling ratio" in this specification. If this ratio equals to one, or if $\mu^2=[(\omega_0/2)\times(1/Q_{in}+1/Q_v)]^2$, the term of $(\omega-\omega_0)^2$ in the denominator of equation (1) becomes zero, thus forming the most ideal flattop shape.

The above-described model illustrated the case where there are two point-like defect resonators and the second optical input/output section is a waveguide. The aforementioned number may be increased from two to N, in which case the term of $\omega^{2N}$ will work in the same manner as in the case of the previous model. If the distance between the first and second optical input/output sections is large, it is advantageous to provide more than two point-like defect resonators to connect the two sections. If more than two point-like defect resonators are used, it is necessary to individually design the point-like defect resonators so that they have the same resonance frequency and the same Q-value because each point-like defect resonator has a different relationship with the surroundings. Similarly, if the second optical input/output section is a point-like defect, it is necessary to individually design the point-like defect resonators because the relationship between each point-like defect resonator and the surroundings changes due to the difference between the second optical input/output section and the first optical input/output section (i.e. a waveguide). If there are two point-like defect resonators and the second optical input/output section is a waveguide, it is preferable to symmetrically arrange the two point-like defect resonators and the two optical input/output sections with respect to a point. This arrangement establishes the same relationship between each of the two point-like defect resonators and the surroundings, allowing the use of the same type of point-like defect resonators to obtain the same resonance frequency and the same Q-value. This facilitates the designing of the multiplexer/demultiplexer.

Even a ray of light whose wavelength equals to the resonance wavelength of the point-like defect resonators can pass by the point-like defect resonators by a certain percentage (transmittance) without being introduced from the first optical input/output section into the resonators. The light is also reflected by the point-like defect resonators by a certain percentage (reflectance). If the second optical input/output section is a waveguide, the light propagates toward both ends of the waveguide. Suppressing these phenomena will improve the multiplexing/demultiplexing efficiency. Therefore, it is preferable to provide the first input/output section and/or the second optical input/output section with a reflecting section for reflecting light whose wavelength equals to the resonance wavelength of the point-like defect resonators. In the first optical input/output section provided with the reflecting section, the light that has not been introduced into the point-like defect resonators but has passed by the resonators will be reflected by the reflecting section and then introduced into the resonators. An appropriate distance setting between the point-like defect resonators and the reflecting section will cause a destructive interference between the light reflected by the point-like defect resonators and the light reflected by the reflecting section, thereby attenuating them. Providing the second optical input/output section with the reflecting section will allow the extraction or introduction of light to be performed only at one end of the waveguide of the second optical input/output section.

For example, the reflecting section can be constructed as follows: Initially, the body is divided into plural zones (called the "forbidden band zones"), with modified refractive index areas being formed within each forbidden band zones with a different arrangement cycle. Then, the first optical input/output section or the second optical input/output section is formed so that it passes through all the forbidden band zones. The transmission wavelength band of the waveguide changes depending on the cycle of the modified refractive index areas. Therefore, the cycle of each forbidden band zone can be appropriately determined so that the resonance wavelength of the point-like defect resonators falls within the transmission wavelength band of the waveguide of the first or second optical input/output section in a forbidden band zone including the point-like defect resonators, whereas it is out of the transmission wavelength band of the waveguide in any other forbidden band zone. This construction prevents the light having the resonance wavelength from propagating through the waveguide in the other forbidden band zones; the light will be reflected at the boundary between the forbidden band zone concerned and an adjacent forbidden band zone. Thus, the boundary functions as the reflecting section. A structure having plural forbidden band zones described above is called the "heterostructure" in this specification.

Figure 4:
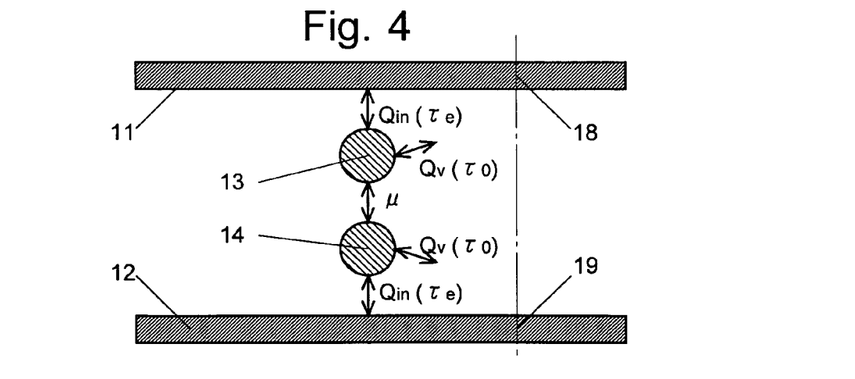
FIG. 4 is a schematic diagram of a two-dimensional photonic crystal multiplexer/demultiplexer having a heterostructure.

FIG. 4 shows the first optical input/output section 11 having a first reflecting section 18 and the second optical input/ output section 12 having a second reflecting section 19. In this case, the multiplex/demultiplex spectrum I(ω) is given by:

$$I(\omega) = \cfrac{4}{\cfrac{\tau_e^2}{\mu^2}\left[\left\{\left(\cfrac{1}{\tau_0}+\cfrac{1}{\tau_e}\right)^2+\mu^2\right\}^2 + 2\left\{\left(\cfrac{1}{\tau_0}+\cfrac{1}{\tau_e}\right)^2-\mu^2\right\}(\omega-\omega_0)^2+(\omega-\omega_0)^4\right]} \quad (3)$$

This spectrum is four times the previous one obtained in the case where no reflecting section is present. Particularly, if $\mu^2=(1/\tau_0+1/\tau_e)^2$ and $Q_{in}<<Q_v$, the multiplex/demultiplex spectrum at $\omega=\omega_0$ equals to one, meaning that the multiplexing/demultiplexing efficiency is 100%.

Figure 5A:
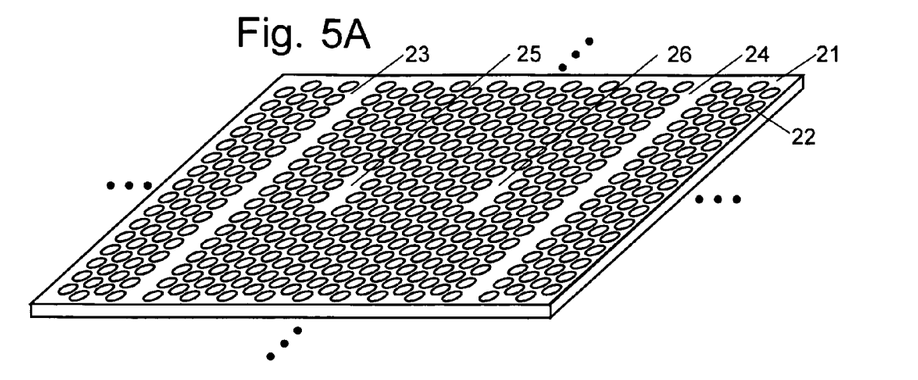
FIG. 5A is a perspective view and FIG. 5B is a plan view of an embodiment of the two-dimensional photonic crystal multiplexer/demultiplexer according to the present invention.
Figure 5B:
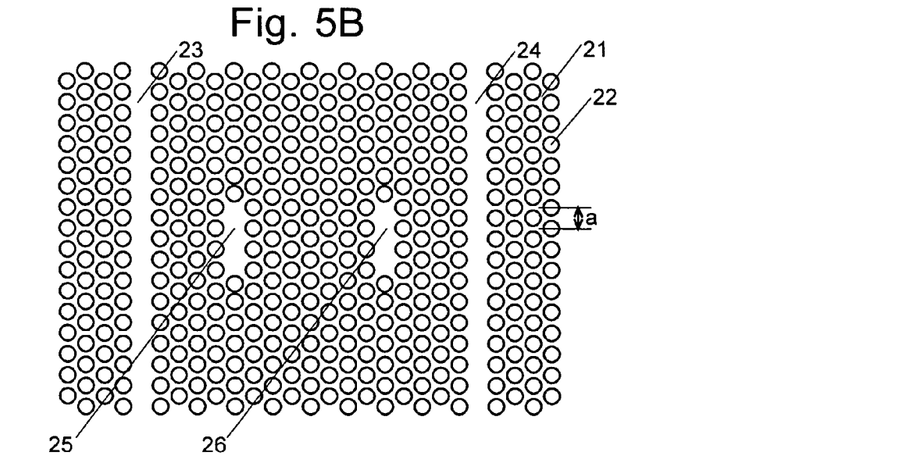

EXPLANATION OF NUMERALS 11, 15 . . . First Optical Input/output section
12, 16 . . . Second Optical Input/output section
13, 14, 17 . . . Point-Like Defect Resonator
21 . . . Body
22 . . . Hole
23, 65 . . . Input Waveguide
24, 66 . . . Output Waveguide
25, 26, 31, 32, 51, 67, 68 . . . Point-Like Defect Bset Mode for Carrying Out the Invention FIG. 5A is a perspective view and FIG. 5B is a plan view of an embodiment of the two-dimensional photonic crystal multiplexer/demultiplexer according to the present invention. The body 21, which is slab shaped, is provided with modified refractive index areas created by boring holes 22 in a triangular lattice pattern with cycle a. This body has an input waveguide 23 and an output waveguide 24, each of which is formed by linearly eliminating the holes 22, or omitting the formation of the holes 22, along a single line. Located between the input waveguide 23 and the output waveguide 24 are two point-like defects 25 and 26 identically shaped. These point-like defects 25 and 26 will be detailed later. The distances between the input waveguide 23 and the point-like defect 25 and between the point-like defect 26 and the output waveguide 24 each correspond to five lines of the holes 22: $(5/2)\times3^{0.5}a$. The distance between the two point-like defects 25 and 26 is $4\times3^{0.5}a$. The following calculation assumes that a is 420 nm and the diameter of the hole 22 is 240 nm. In this two-dimensional photonic crystal multiplexer/demultiplexer, the two point-like defects and the two waveguides are symmetrically arranged with respect to a point.

Figure 6:
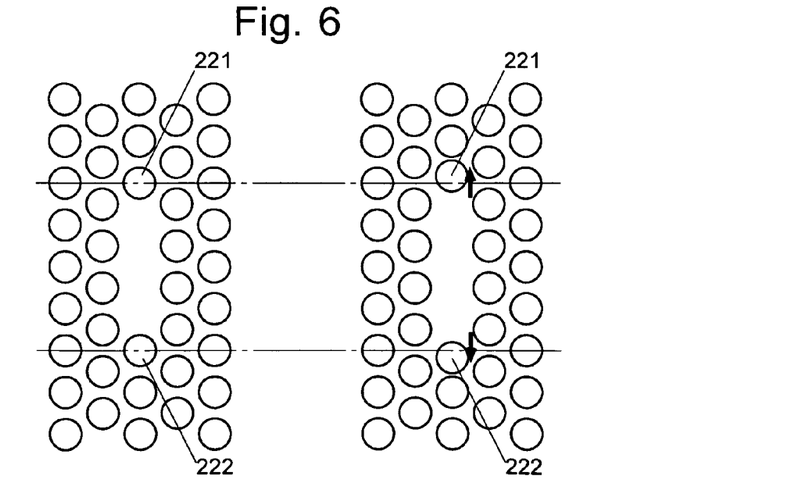
FIG. 6 is a plan view for explaining the point-like defect of the two-dimensional photonic crystal multiplexer/demultiplexer of the aforementioned embodiment.

As shown in FIG. 6, the point-like defects 25 and 26 are each formed by omitting three holes 22 lying on a straight line. Being entirely constituted by the same material as that of the body 21, these point-like defects can easily confine light because there is a difference in refractive index between the body 21 and the surrounding air. Therefore, these point-like defects prevent light from leaking from the surface of the body 21 to the outside, thus yielding a high level of Q-value. In addition, as shown in FIG. 6B, two holes 221 and 222 closest to the point-like defects are each shifted to a position 0.15a farther from the point-like defect than the position shown in FIG. 6A where each hole is located at a triangular lattice point. According to calculation of the present inventors, shifting the holes 221 and 222 as described above will enhance $Q_v$ (the Q-value between the point-like defect and the outside of the crystal) up to $Q_v\sim46600$, much higher than the value obtained without shifting the holes: $Q_v\sim5200$.

In addition to $Q_v\sim46600$, the parameters relating to the two-dimensional photonic crystal multiplexer/demultiplexer of the present embodiment can be calculated using the finite difference time domain method (FDTD method) as follows: $Q_{in}$, the Q-value between the input waveguide 23 and the point-like defect 25 as well as between the point-like defect 26 and the output waveguide 24, is $Q_{in}\sim3590$; and μ, the mutual coupling coefficient between the point-like defects 25 and 26, is $\mu\sim-1.42\times10^{-4}\omega_0$. From these values, the coupling ratio is derived as 0.90, which falls within the aforementioned preferable range: 0.2 to 10. Also, the resonance wavelength $\lambda_0$ of the point-like defects 25 and 26 is 1581.6 nm.

Figure 7A:
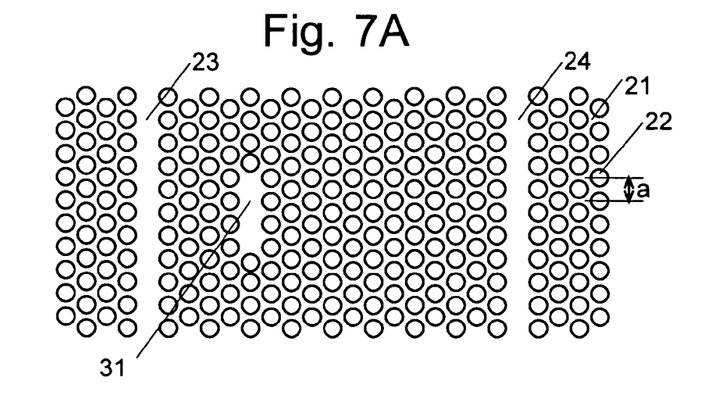
FIG. 7 is a schematic diagram of the two-dimensional photonic crystal multiplexer/demultiplexer of the comparative example.
Figure 7B:
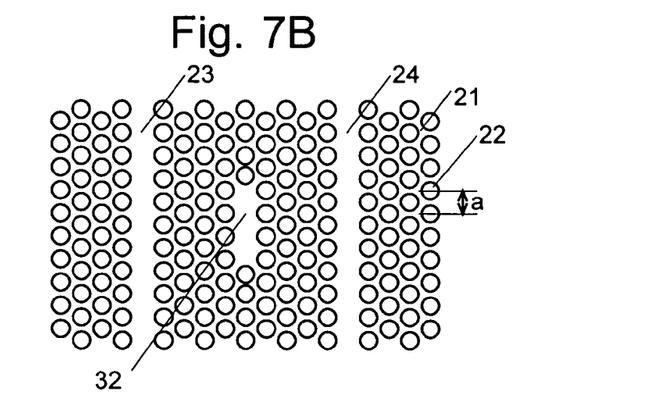
Figure 8:
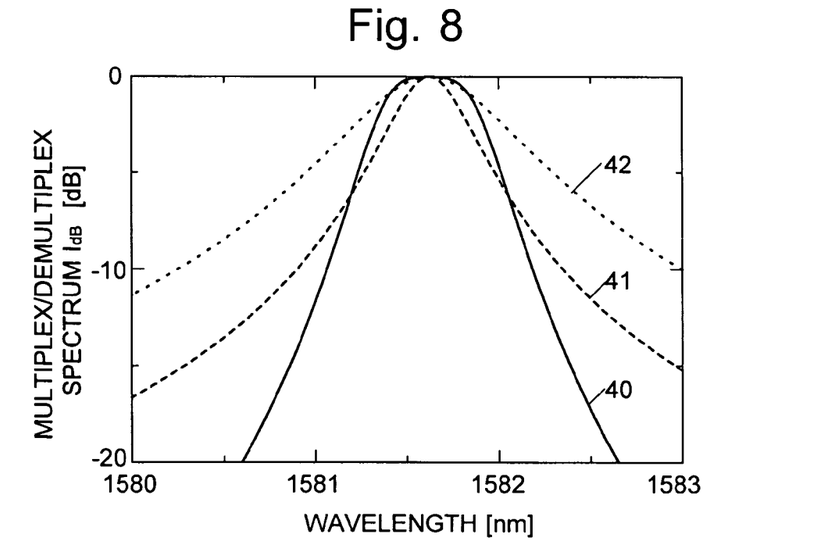
FIG. 8 is a graph showing the result of calculating the multiplex/demultiplex spectrums of the two-dimensional photonic crystal multiplexers/demultiplexers of the aforementioned embodiment and the comparative example, using the mode coupling theory.

From these parameters, the multiplex/demultiplex spectrum of the two-dimensional photonic crystal multiplexer/demultiplexer of the present embodiment has been derived using the mode coupling theory. For comparison, the same calculation has been conducted also for the following two constructions: Comparative Example 1 (FIG. 7A): a two-dimensional photonic crystal multiplexer/demultiplexer having only one point-like defect 31, which construction corresponds to the present embodiment with one of the point-like defects eliminated; and Comparative Example 2 (FIG. 7B): a two-dimensional photonic crystal multiplexer/demultiplexer having only one point-like defect 32 equally spaced from both the input waveguide 23 and the output waveguide 24 by a distance of $(5/2) \times 3^{0.5} a$. The results of the calculations are shown in FIG. 8. The ordinate indicates the multiplex/demultiplex spectrum $I(\lambda)$ in decibels: $I_{dB} = 10 \times \log[I(\lambda)/I(\lambda_0)]$. The multiplex/demultiplex spectrum 40 of the present embodiment has the following features:

(i) Within the range in the proximity of $\lambda_0$, the multiplex/demultiplex spectrum of the present embodiment takes larger values than the comparative examples, showing a flattop shape. For example, the wavelength range where $I_{dB}$ is equal to or larger than $-1$ dB (i.e. $I(\lambda) \sim 0.79 I(\lambda_0)$) is 0.25 nm for the multiplex/demultiplex spectrum 41 of Comparative Example 1, 0.45 nm for the multiplex/demultiplex spectrum 42 of Comparative Example 2, and 0.43 nm for the present embodiment, which is larger than the value of Comparative Example 1. Therefore, even if the resonance wavelength $\lambda_0$ is displaced from the original value due to an error of a light generator or some other factor, the loss is smaller in the present embodiment than in Comparative Example 1.

(ii) At any wavelength about 0.4 nm or more away from the resonance wavelength $\lambda_0$, the multiplex/demultiplex spectrum takes a smaller value in the present embodiment than in any other comparative examples, showing a shorter tail. The wavelength range where $I_{dB}$ equals to $-20$ dB (i.e. $I(\lambda) \sim 0.01 I(\lambda_0)$) is 2.01 nm wide in the present embodiment; this width is smaller than 4.8 nm of Comparative Example 1 or 9.2 nm of Comparative Example 2. Thus, compared to the other examples, the construction of the present embodiment can reduce the noise caused by signals within the wavelength range far from the resonance wavelength $\lambda_0$ and suppress the crosstalk with signals from other channels.

Figure 9:
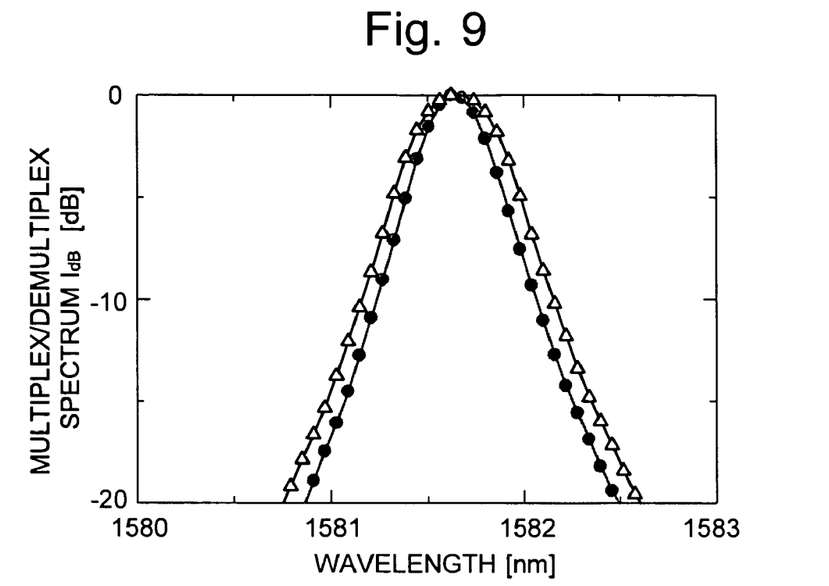
FIG. 9 shows the result of calculating the multiplex/demultiplex spectrum of the two-dimensional photonic crystal multiplexer/demultiplexer, using the finite difference time domain (FDTD) method.

The above-described calculation method using the mode coupling theory is advantageous in that the multiplex/demultiplex spectrum can be derived using function formulae. However, the method is easily affected by an error in Q-value or mutual coupling coefficient $\mu$. Therefore, additional calculations have been conducted using the FDTD method, which numerically determines the multiplex/demultiplex spectrum without computing the Q-value or $\mu$. The result is as shown in FIG. 9 by filled circles. Though the multiplex/demultiplex spectrum obtained is narrower than that calculated using the mode coupling theory, it also shows a flattop shape at around the resonance wavelength $\lambda_0$ and a short tail stretched over the wavelength range far from the resonance wavelength $\lambda_0$, as in the result of the calculation using the mode coupling theory.

Figure 10:
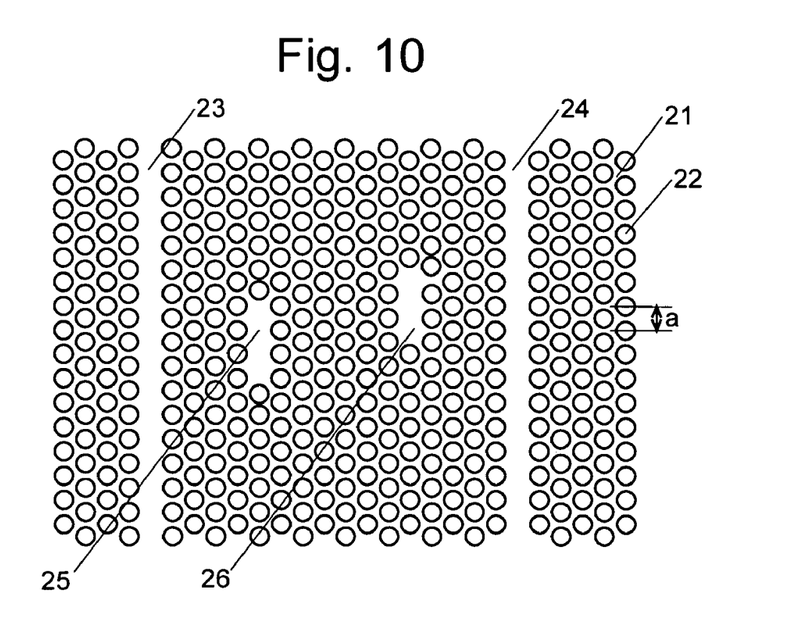
FIG. 10 is a plan view of a two-dimensional photonic crystal multiplexer/demultiplexer as another embodiment.

In addition, the multiplex/demultiplex spectrum has been calculated using the FDTD method for the case where the point-like defect 26 is shifted in the direction perpendicular to the waveguide by $(7/2) \times 3^{0.5} a$ and in the longitudinal direction of the waveguide by $1.5a$ with respect to the point-like defect 25. The result is as shown in FIG. 9 by triangles. The two sets of data shown in FIG. 9 suggests that the construction of FIG. 10 having larger values at around the resonance wavelength is preferable if the discrepancy of the resonance wavelength $\lambda_0$ is regarded as more important, whereas the construction of FIG. 5 is recommendable if the suppression of the noise or crosstalk is more important.

Figure 11:
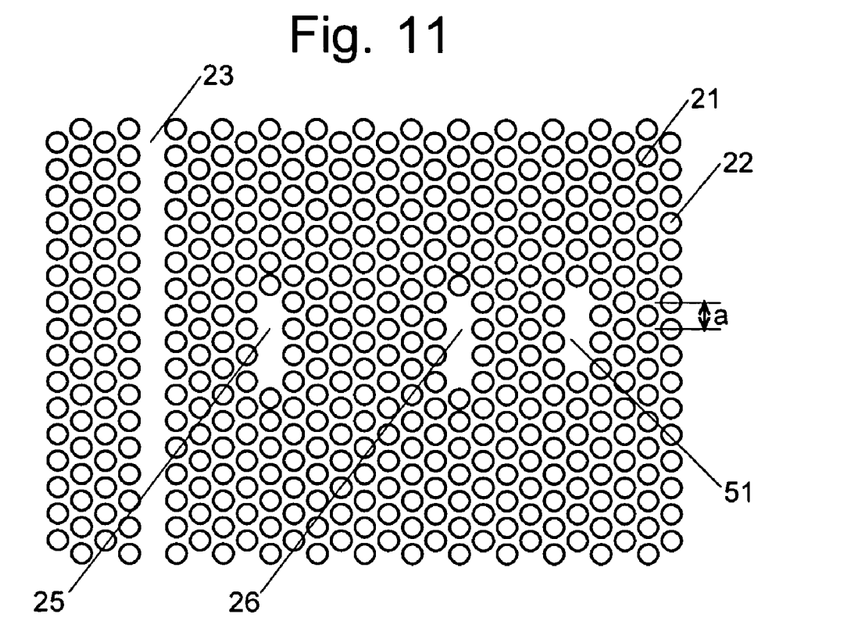
FIG. 11 is a schematic diagram showing another embodiment of the two-dimensional photonic crystal multiplexer/demultiplexer according to the present invention.

In the embodiment above, the optical output section of the demultiplexer is constructed as the output waveguide 24. It is also possible to construct it as a point-like defect. This point-like defect also functions as the input section of a multiplexer. In the example shown in FIG. 11, the output section of the demultiplexer (or the input section of the multiplexer) consists of a point-like defect 51 formed by omitting three holes 22 lying on a line, similar to the point-like defects 25 and 26. The holes closest to the point-like defect 51 are arranged at positions closer to the corresponding triangular lattice points than in the case of the point-like defects 25 and 26. This arrangement makes the Q-value of the point-like defect 51 smaller than that of the point-like defect 25 or 26. The light extracted from the input waveguide 23 is transmitted through the point-like defects 25 and 26 and emitted from the body surface of the point-like defect 51 having the reduced Q-value to the outside of the crystal.

The two-dimensional photonic crystal multiplexer/demultiplexer according to the present invention can take various forms: the point-like defect may be differently shaped, such as a hole having a different diameter; and the holes may be arranged in a different cyclic pattern, such as a square lattice pattern.

FIG. 12 shows an embodiment of the two-dimensional photonic crystal multiplexer/demultiplexer provided with reflecting sections at the first and second optical input/output sections, respectively, and having a heterostructure. The body 61 consists of two forbidden band zones 63 and 64. The input waveguide 65 and the output waveguide 66, which are identically shaped, pass through the two forbidden band zones 63 and 64. The cycle of the holes 62 is $a_1$ for the forbidden band zone 63 and $a_2$ for the forbidden band zone 64, where $a_1 > a_2$. Two point-like defects 67 and 68 having the same shape are located between the input waveguide 65 and the output waveguide 66.

In this construction, the transmission wavelength band of the waveguide in the two forbidden band zones is as shown in FIG. 13. The input waveguide 65 and the output

The invention claimed is:

1. A two-dimensional photonic crystal multiplexer/demultiplexer, comprising:
   a) a slab-shaped body;
   b) a plurality of areas arranged in a lattice pattern with a predetermined cycle within the body, where a refractive index of the areas differs from that of the body;
   c) a first optical input/output section consisting of a waveguide formed in the body, where the waveguide is made of a linear defect of modified refractive index areas;
   d) a second optical input/output section formed in the body; and
   e) two point-like defect resonators composed of point-like defects having substantially the same resonance wavelength and arranged in series between the first and second optical input/output sections, each point-like defect consisting of a point-like region devoid of the modified refractive index areas,
   wherein a value of a coupling ratio defined as $\mu^2/[(\omega_0/2) \times (1/Q_{in} + 1/Q_v)]^2$ is 0.2~10, where $\omega_0$ is a resonance frequency of the point-like defect resonators, $Q_{in}$ is a Q-value between one of the first and second optical input/output sections and the point-like defect resonator closest to the section, $Q_v$ is a Q-value between each of the point-like defect resonators and an outside of the crystal, and $\mu$ is a mutual coupling coefficient between the point-like defect resonators.

2. The two-dimensional photonic crystal multiplexer/demultiplexer according to claim 1, wherein the second optical input/output section is a point-like defect whose Q-value with respect to an outside of the crystal is smaller than that of the point-like defect resonators.

3. The two-dimensional photonic crystal multiplexer/demultiplexer according to claim 2, wherein at least one of the point-like resonators is a donor type defect formed by eliminating one or more of the modified refractive index areas.

4. The two-dimensional photonic crystal multiplexer/demultiplexer according to claim 1, wherein the second optical input/output section is a waveguide consisting of a linear defect of the modified refractive index areas.

5. The two-dimensional photonic crystal multiplexer/demultiplexer according to claim 4, wherein the second optical input/output section is provided with a second reflecting section for reflecting light whose wavelength equals to the resonance wavelength.

6. The two-dimensional photonic crystal multiplexer/demultiplexer according to claim 1, wherein the first optical input/output section is provided with a first reflecting section for reflecting light whose wavelength equals to the resonance wavelength.

7. The two-dimensional photonic crystal multiplexer/demultiplexer according to claim 5, wherein:
the body is composed of plural forbidden band zones, with modified refractive index areas being formed within each forbidden band zones with a different arrangement cycle;

the first optical input/output section or the second optical input/output section is formed so that it passes through all the forbidden band zones; and the resonance wavelength of the point-like defect resonators falls within a transmission wavelength band of the waveguide of the first or second optical input/output section in a forbidden band zone including the point-like defect resonators, whereas it is out of the transmission wavelength band of the waveguide in any other forbidden band zone.

8. The two-dimensional photonic crystal multiplexer/demultiplexer according to claim 1, wherein there are exactly two point-like defect resonators; and the point-like defect resonators and the optical input/output sections are symmetrically arranged with respect to a point.

9. The two-dimensional photonic crystal multiplexer/demultiplexer according to claim 1, wherein one or more of the modified refractive index areas located in a proximity of the point-like defect resonators are shifted from positions determined by the arrangement cycle.

* * * * *